US007975430B2

(12) United States Patent  (10) Patent No.: US 7,975,430 B2
Scott  (45) Date of Patent: Jul. 12, 2011

(54) EXPANDABLE HYDROPONIC GROWING SYSTEM

(76) Inventor: Joshua Scott, Vail, AZ (US)

( * ) Notice: Subject to any disclaimer, the term of this patent is extended or adjusted under 35 U.S.C. 154(b) by 200 days.

(21) Appl. No.: 12/464,766

(22) Filed: May 12, 2009

(65) Prior Publication Data

US 2009/0277088 A1 Nov. 12, 2009

Related U.S. Application Data

(60) Provisional application No. 61/052,441, filed on May 12, 2008.

(51) Int. Cl.
*A01G 31/06* (2006.01)
(52) U.S. Cl. .......................... 47/62 R; 211/80
(58) Field of Classification Search ............ 47/39, 59 R, 47/63, 82, 83; 211/80; 248/27.8, 132, 149, 248/157, 161, 217.1
See application file for complete search history.

(56) References Cited

U.S. PATENT DOCUMENTS

| 1,617,352 | A | * | 2/1927 | Smith .......................... 248/27.8 |
| 3,615,026 | A | * | 10/1971 | Englert et al. ................... 211/80 |
| 4,037,360 | A | | 7/1977 | Farnsworth |
| 4,312,152 | A | | 1/1982 | Drury et al. |
| 4,487,588 | A | | 12/1984 | Lewis, III et al. |
| 4,513,533 | A | | 4/1985 | Gething et al. |
| 4,622,775 | A | | 11/1986 | Glenn et al. |
| 5,261,185 | A | | 11/1993 | Koide et al. |
| 5,324,657 | A | | 6/1994 | Tanny |
| 5,435,098 | A | | 7/1995 | Koide et al. |
| 7,320,197 | B2 | | 1/2008 | Meyer |
| 7,677,513 | B1 | * | 3/2010 | Londo ........................ 248/217.1 |
| 2008/0086944 | A1 | * | 4/2008 | Ribeiro De Matos ............ 47/82 |
| 2009/0277088 | A1 | * | 11/2009 | Scott .............................. 47/62 R |
| 2010/0242360 | A1 | * | 9/2010 | Dyas .............................. 47/66.5 |

* cited by examiner

*Primary Examiner* — Francis T Palo

(57) ABSTRACT

An expandable hydroponic growing system comprising a multiple of upper bases, lower bases and bars connecting the bases in a fashion that the upper bases (and lower bases) can be conveniently pulled together or pushed farther apart.

17 Claims, 12 Drawing Sheets

U.S. 7,975,430 B2

EXPANDABLE HYDROPONIC GROWING SYSTEM

PRIORITY

The present application is a non-provisional patent application which claims the benefit of provisional application serial number 61/052,441, filed May 12, 2008, the disclosure of which is incorporated in its entirety by reference herein.

BACKGROUND OF THE INVENTION

Efficient use of space in controlled environment agriculture generally requires a means to change the distance between maturing plants. Most often, spacing is accomplished through the use of labor because of the high costs and complexity associated with automated systems.

The present invention features an expandable hydroponic growing system is advantageous in that it can reduce the labor requirements by increasing the automation of re-spacing via an inventive arrangements of connector bars and bases.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
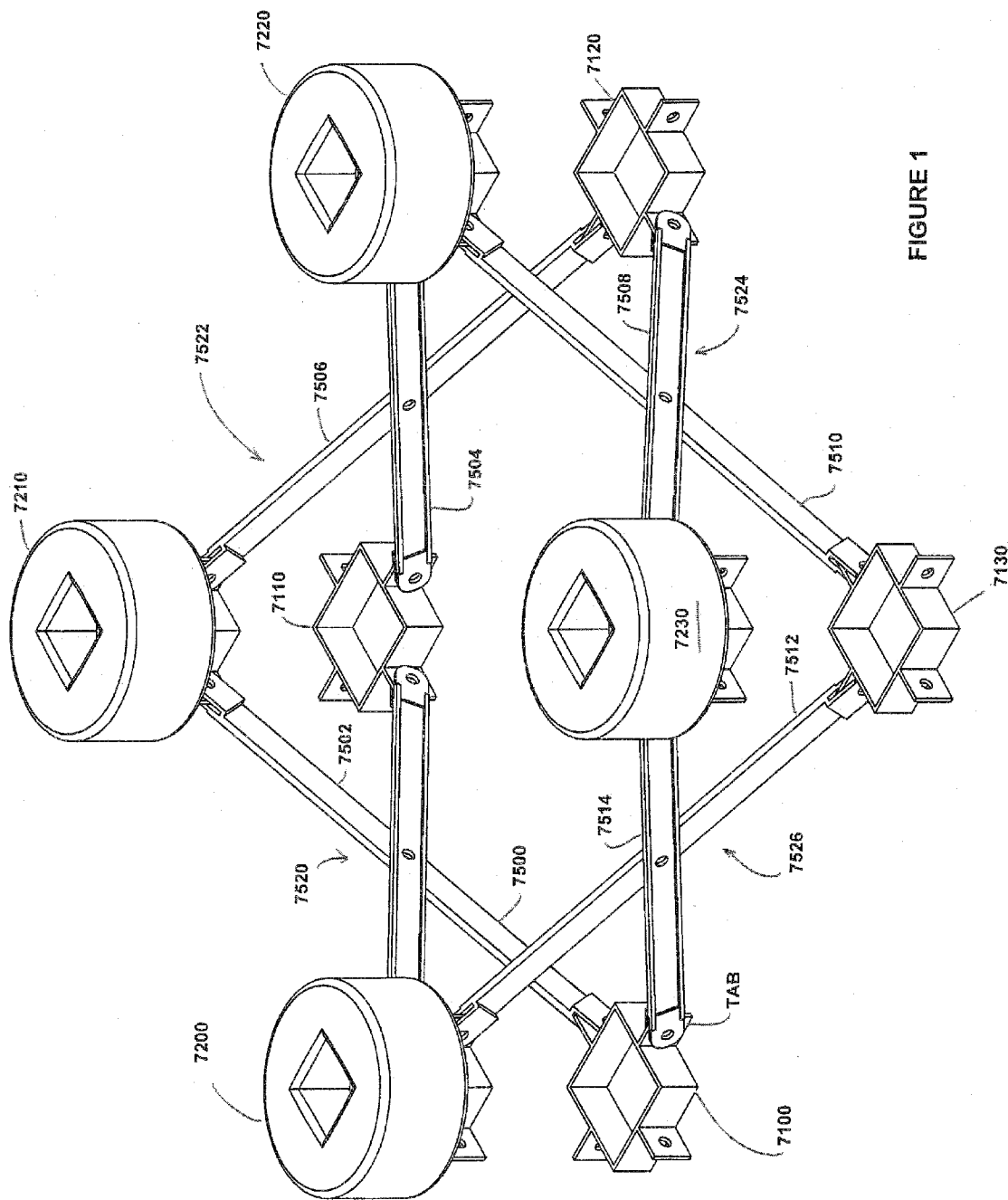
FIG. 1 shows a perspective view of a generic expandable hydroponic growing system of the present invention.

Referring now to FIG. 1, the present invention features an expandable hydroponic growing system. In some embodiments, the system comprises a first lower base 7100, a second lower base 7110, a third lower base 7120 and a fourth lower base 7130.

In some embodiments, the lower bases are arranged in a rectangle configuration with respect to each other. For example, the first lower base 7100 is at a first corner of the rectangle, a second lower base 7110 is at a second corner of the rectangle, a third lower base 7120 is a third corner of the rectangle and a fourth lower base 7130 is at a fourth corner of the rectangle configuration.

In some embodiments, the system comprises a first upper base 7200, a second upper base 7210, a third upper base 7220 and a fourth upper base 7230. In some embodiments, the upper bases are arranged in a rectangle configuration 400 with respect to each other. For example, the first upper base 7200 is at a first corner of the rectangle, a second upper base 7210 is at a second corner of the rectangle, a third upper base 7220 is a third corner of the rectangle and a fourth upper base 7230 is at a fourth corner of the rectangle configuration.

In some embodiments, the rectangle configuration is a square configuration. In some embodiments, when the rectangle configuration is a square configuration, the bar pairs are of the same length.

In some embodiments, the system further comprises pairs of bars. For example, a first bar pair 7520 comprises a first bar 7500 and a second bar 7502. The first bar 7500 has a first end and a second end. The first end pivotably connects to the first bottom base and the second end pivotably connects to the second upper base. The second bar 7502 having a first end and a second end. The first end pivotably connects to the lower second base and the second end pivotably connects to the first upper base. The ends of the bars can pivotably connect to any appropriate location on the bases. In some embodiments, the ends of the bars pivotably connect to the bases directly. In some embodiments, the ends of the bars pivotably connect to the bases through a tab that extends from the bases.

In some embodiments, the system comprises a second bar pair 7522, which comprises a third bar 7504 and a fourth bar 7506. The third bar 7504 has a first end and a second end. The first end pivotably connects to the second bottom base 7110 and the second end pivotably connects to the third upper base 7220. The fourth bar 7506 has a first end and a second end. The first end pivotably connects to the lower third base 7120 and the second end pivotably connects to the second upper base 7210. In some embodiments, the ends of the bars pivotably connect to the bases directly. In some embodiments, the ends of the bars pivotably connect to the bases through a tab that extends from the bases.

In some embodiments, the system comprises a third bar pair 7524, which comprises a fifth bar 7508 and a sixth bar 7510. The fifth bar 7508 has a first end and a second end. The first end pivotably connects to the third bottom base 7120 and the second end pivotably connects to the fourth upper base 7230. The sixth bar 7510 has a first end and a second end. The first end of the sixth bar 7510 pivotably connects to the fourth base 7130 and the second end pivotably connects to the third upper base 7220. In some embodiments, the ends of the bars pivotably connect to the bases directly. In some embodiments, the ends of the bars pivotably connect to the bases through a tab that extends from the bases.

In some embodiments, the system comprises a fourth bar pair 7526, which comprises a seventh bar 7512 and an eighth bar 7514. The seventh bar 7512 has a first end and a second end. The first end of the seventh bar 7512 pivotably connects to the fourth bottom base 7130 and the second end pivotably connects to the first upper base 7200. The eighth bar 7514 has a first end and a second end. The first end of the eighth bar 7514 pivotably connects to the lower first base 100 and the second end pivotably connects to the fourth upper base. In some embodiments, the ends of the bars pivotably connect to the bases directly. In some embodiments, the ends of the bars pivotably connect to the bases through a tab that extends from the bases.

In some embodiments, the first lower base is disposed directly below the first upper base, the second lower base is disposed directly below the second upper base, the third lower base is disposed directly below the third upper base, and the fourth lower base is disposed directly below the fourth upper base.

In some embodiments, in a folded position, the first ends of the bars are pushed closer together. In an expanded position, the first ends of the bars are pushed farther apart, see for example, FIG. 4. In some embodiments, the respective two bars of each bar pair slide pass each other on a same plane. In some embodiments, as an option, the respective two bars of each bar pair are pivotably hinged at their respective mid-regions.

In some embodiments, the system may be extended beyond four bases with additional bases. For example, the first base 7100 may be linked to an additional upper base and the first upper base 7200 may be linked to an additional lower base via a pair of bars in a similar fashion to the first, second, third and fourth pair of bars of the system.

The scope of the above system covers the expandable hydroponic growing systems 50 and 55 which are discussed in detailed below. In some specific embodiments of the present invention discussed below, the term "connector" is an example of a "bar", and the term "base component" is an example of a "base".

Figure 2A:
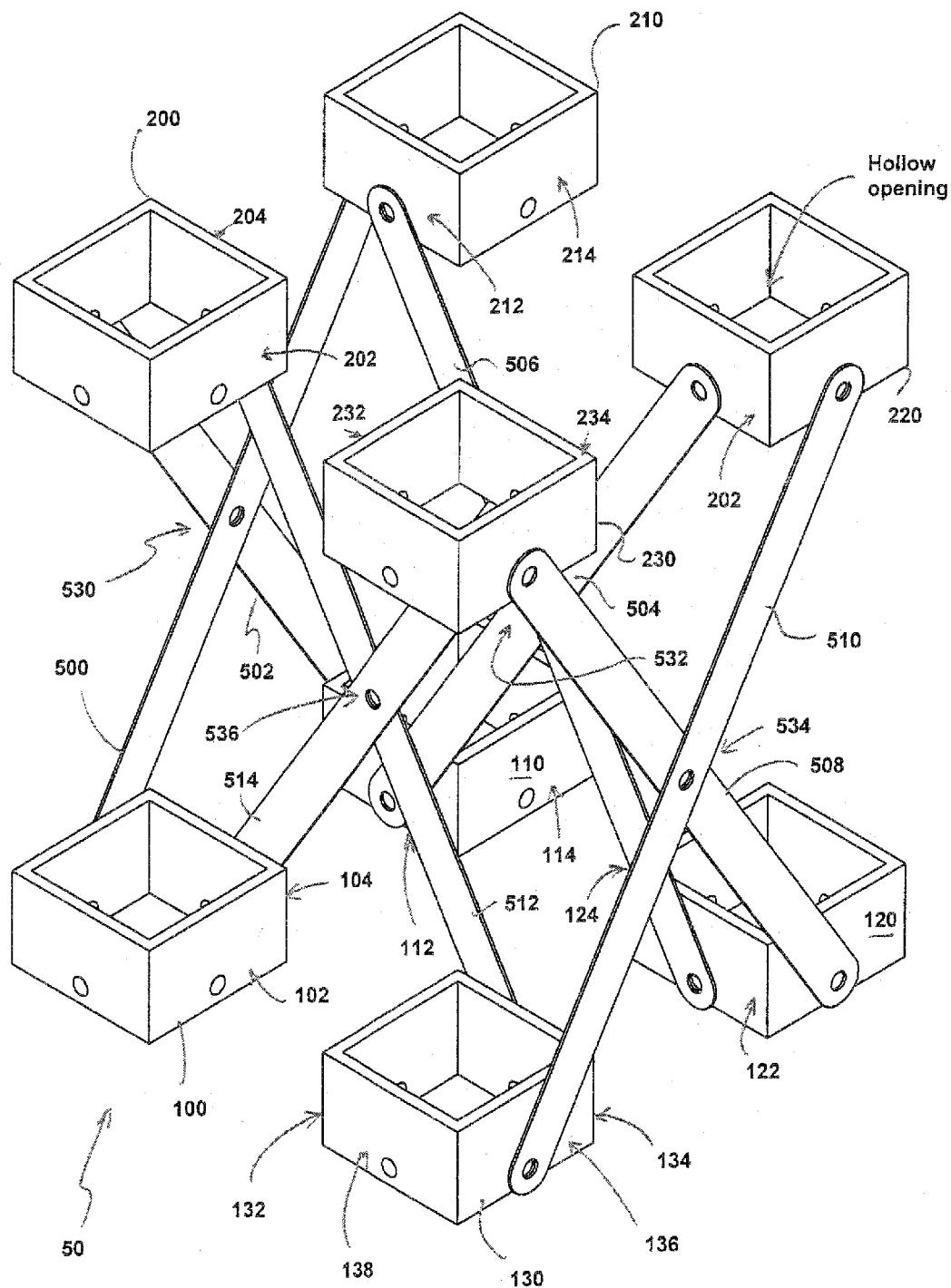
FIG. 2A shows a perspective view of an expandable hydroponic growing system of the present invention.
Figure 2B:
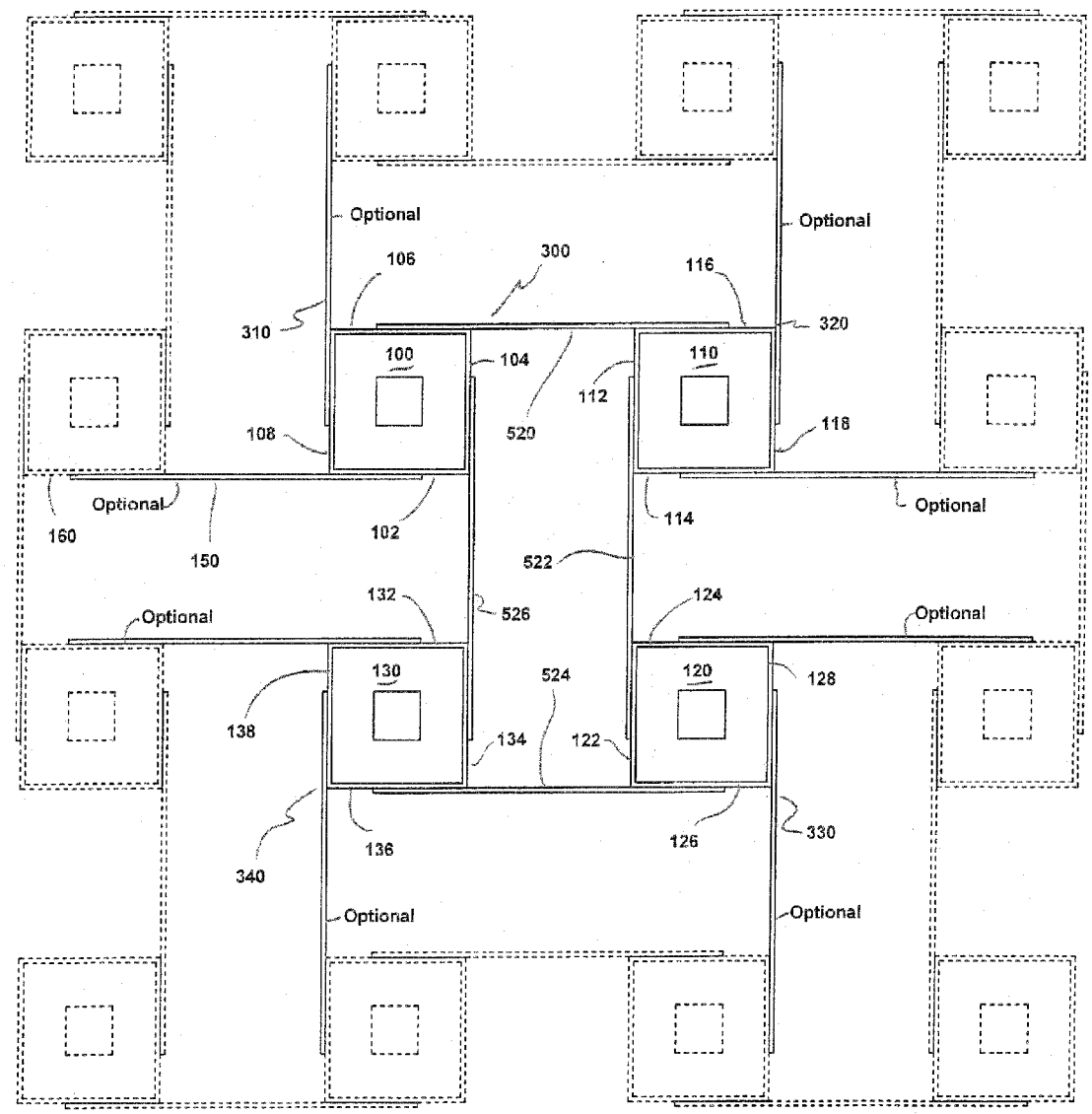
FIG. 2B shows a top view of the arrangement of the lower bases in relation to each other.
Figure 2C:
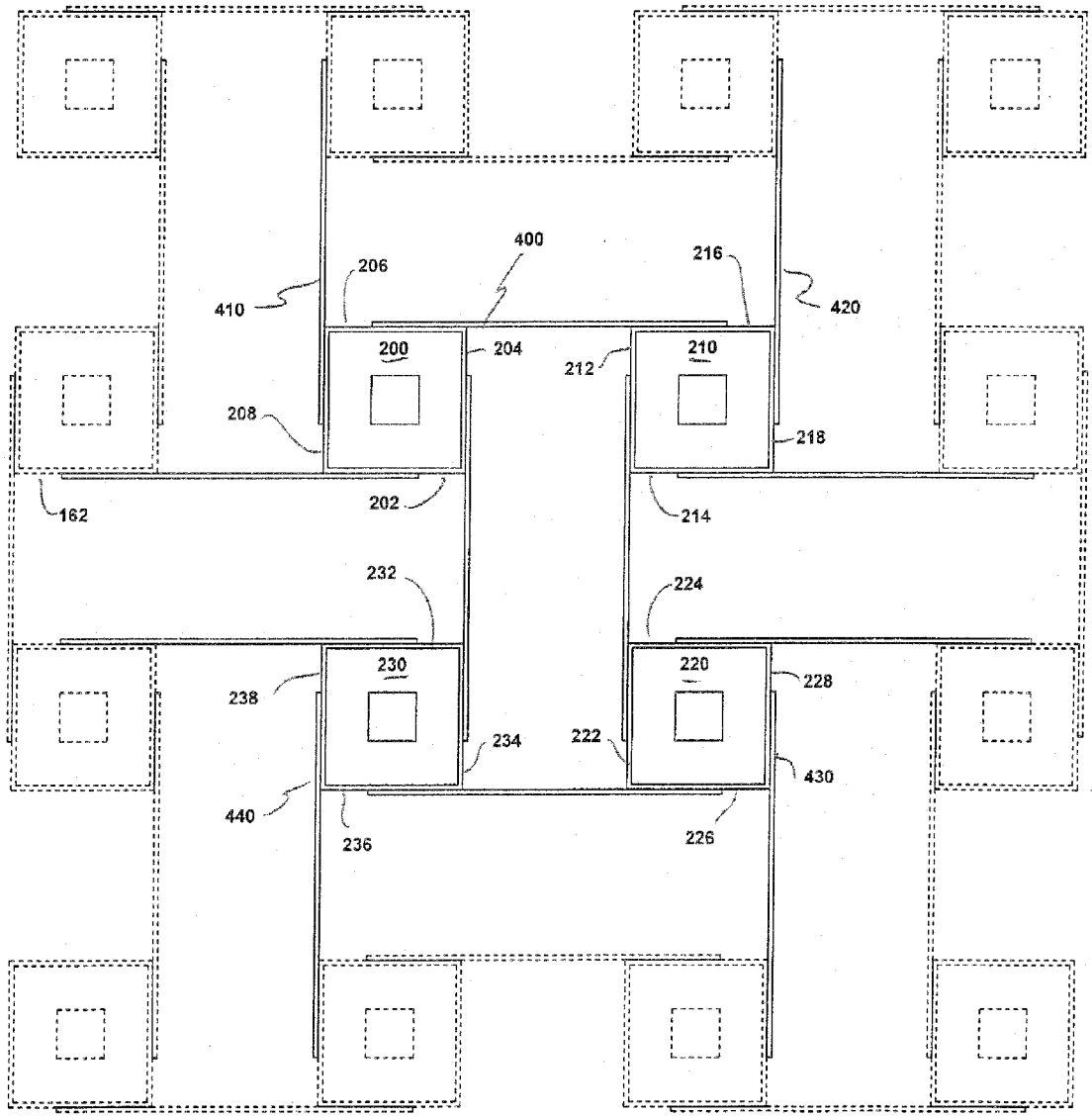
FIG. 2C shows a top view of the arrangement of the upper bases in relation to each other.
Figure 3:
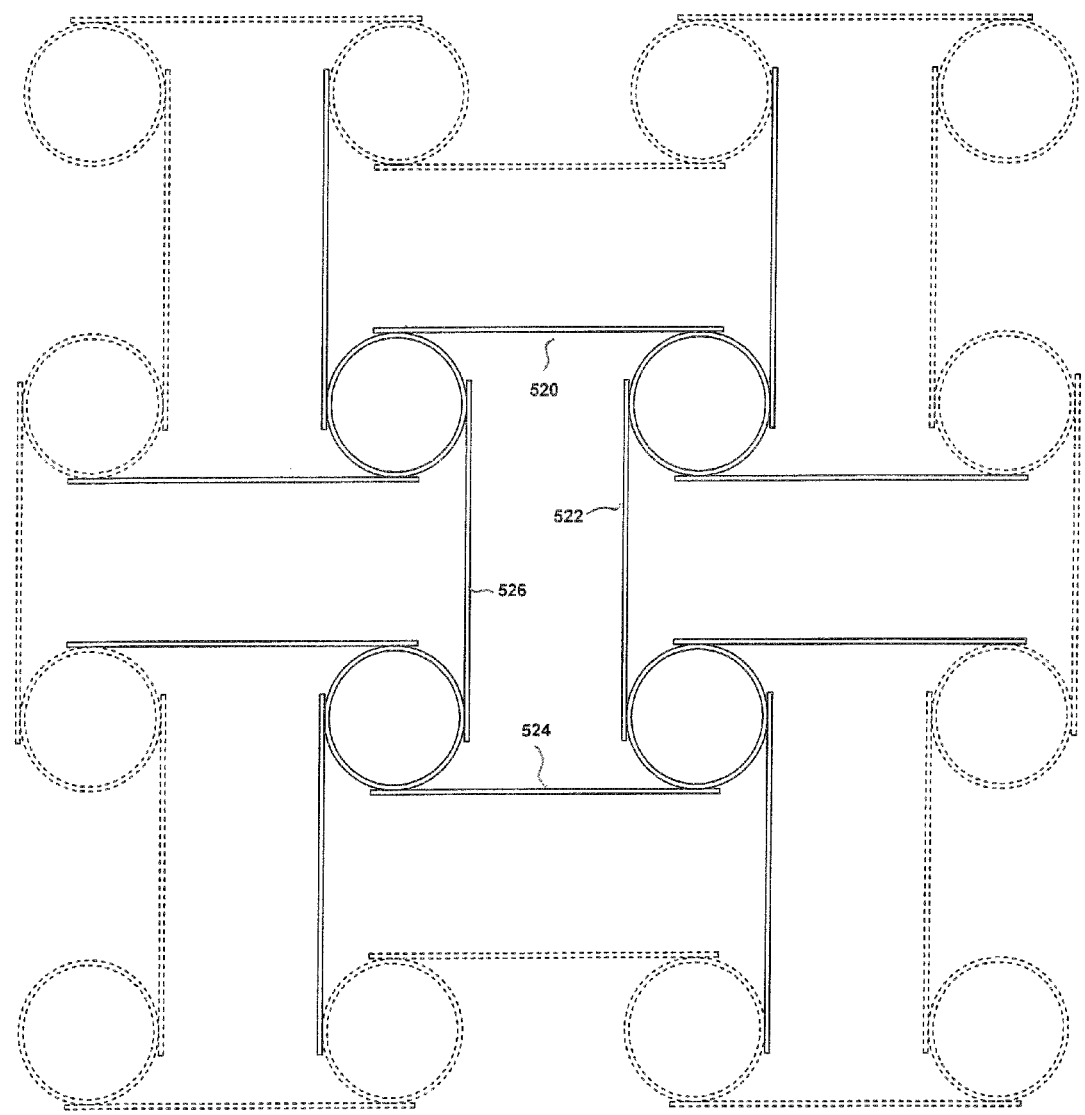
FIG. 3 shows a top view of the lower or upper bases in relation to each other, where the bases are cylindrical instead of cubical

Referring now to FIG. 2A, FIG. 2B, and FIG. 2C the present invention features an expandable hydroponic growing system 50. In some embodiments, the system comprises a first lower base 100, a second lower base 110, a third lower base 120 and a fourth lower base 130, wherein each lower base has a first interior side (e.g., 102, 112, 122, 132), a second interior side (e.g., 104, 114, 124, 134), a first exterior side (e.g., 106, 116, 126, 136) and a second exterior side (e.g., 108, 118, 128, 138).

In some embodiments, the lower bases are arranged in a rectangle configuration 300 with respect to each other. For example, the first lower base 100 is at a first corner 310 of the rectangle, a second lower base 110 is at a second corner 320 of the rectangle, a third lower base 120 is a third corner 330 of the rectangle and a fourth lower base 130 is at a fourth corner 340 of the rectangle configuration.

In some embodiments, the system 50 comprises a first upper base 200, a second upper base 210, a third upper base 220 and a fourth upper base 230. In some embodiments, each upper base has a first interior side (e.g., 202, 212, 222, 232), a second interior side (e.g., 204, 214, 224, 234), a first exterior side (e.g., 206, 216, 226, 236) and a second exterior side (e.g., 208, 218, 228, 238). In some embodiments, the upper bases are arranged in a rectangle configuration 400 with respect to each other. For example, the first upper base 200 is at a first corner 410 of the rectangle, a second upper base 210 is at a second corner 420 of the rectangle, a third upper base 220 is a third corner 430 of the rectangle and a fourth upper base 230 is at a fourth corner 440 of the rectangle configuration.

In some embodiments, the rectangle configuration 300/400 is a square configuration. In some embodiments, when the rectangle configuration is a square configuration, the bar pairs are of the same length.

In some embodiments, the system 50 further comprises pairs of bars. For example, a first bar pair 520 comprises a first bar 500 and a second bar 502. The first bar 500 has a first end and a second end. The first end pivotably connects to the first exterior 106 side of the first bottom base and the second end pivotably connects to the first exterior side 216 of the second upper base. The second bar 502 having a first end and a second end. The first end pivotably connects to the first exterior side 116 of the lower second base and the second end pivotably connects to the first exterior side 206 of the first upper base.

In some embodiments, the system 50 comprises a second bar pair 522, which comprises a third bar 504 and a fourth bar 506. The third bar 504 has a first end and a second end. The first end pivotably connects to the first interior 112 side of the second bottom base 110 and the second end pivotably connects to the first interior side 222 of the third upper base 220. The fourth bar 506 has a first end and a second end. The first end pivotably connects to the first interior side 122 of the lower third base 120 and the second end pivotably connects to the first interior side 212 of the second upper base 210.

In some embodiments, the system 50 comprises a third bar pair 524, which comprises a fifth bar 508 and a sixth bar 510. The fifth bar 508 has a first end and a second end. The first end pivotably connects to the first exterior 126 side of the third bottom base 120 and the second end pivotably connects to the first exterior side 236 of the fourth upper base 230. The sixth bar 510 has a first end and a second end. The first end of the sixth bar 510 pivotably connects to the first exterior side 136 of the lower fourth base 130 and the second end pivotably connects to the first exterior side 226 of the third upper base 220.

In some embodiments, the system 50 comprises a fourth bar pair 526, which comprises a seventh bar 512 and an eighth bar 514. The seventh bar 512 has a first end and a second end. The first end of the seventh bar 512 pivotably connects to the second interior 134 side of the fourth bottom base 130 and the second end pivotably connects to the second interior side 204 of the first upper base 200. The eighth bar 514 has a first end and a second end. The first end of the eighth bar 514 pivotably connects to the second interior side 104 of the lower first base 100 and the second end pivotably connects to the second interior side 234 of the fourth upper base.

In some embodiments, the first lower base is disposed directly below the first upper base, the second lower base is disposed directly below the second upper base, the third lower base is disposed directly below the third upper base, and the fourth lower base is disposed directly below the fourth upper base.

In some embodiments, in a folded position, the first ends of the bars are pushed closer together. In an expanded position, the first ends of the bars are pushed farther apart, see for example, FIG. 4. In some embodiments, the respective two bars of each bar pair slide pass each other on a same plane. In some embodiments, as an option, the respective two bars of each bar pair are pivotably hinged at their respective mid-regions (e.g., 530, 532, 534, and 536).

In some embodiments, the system 50 may be extended beyond four bases with additional bases. For example, the first interior side 102 of the first base 100 may be linked to an additional upper base 162 and the first interior side 202 of the upper base 200 may be linked to an additional lower base 160 via a pair of bars in a similar fashion to the first, second, third and fourth pair of bars of the system.

Figure 5:
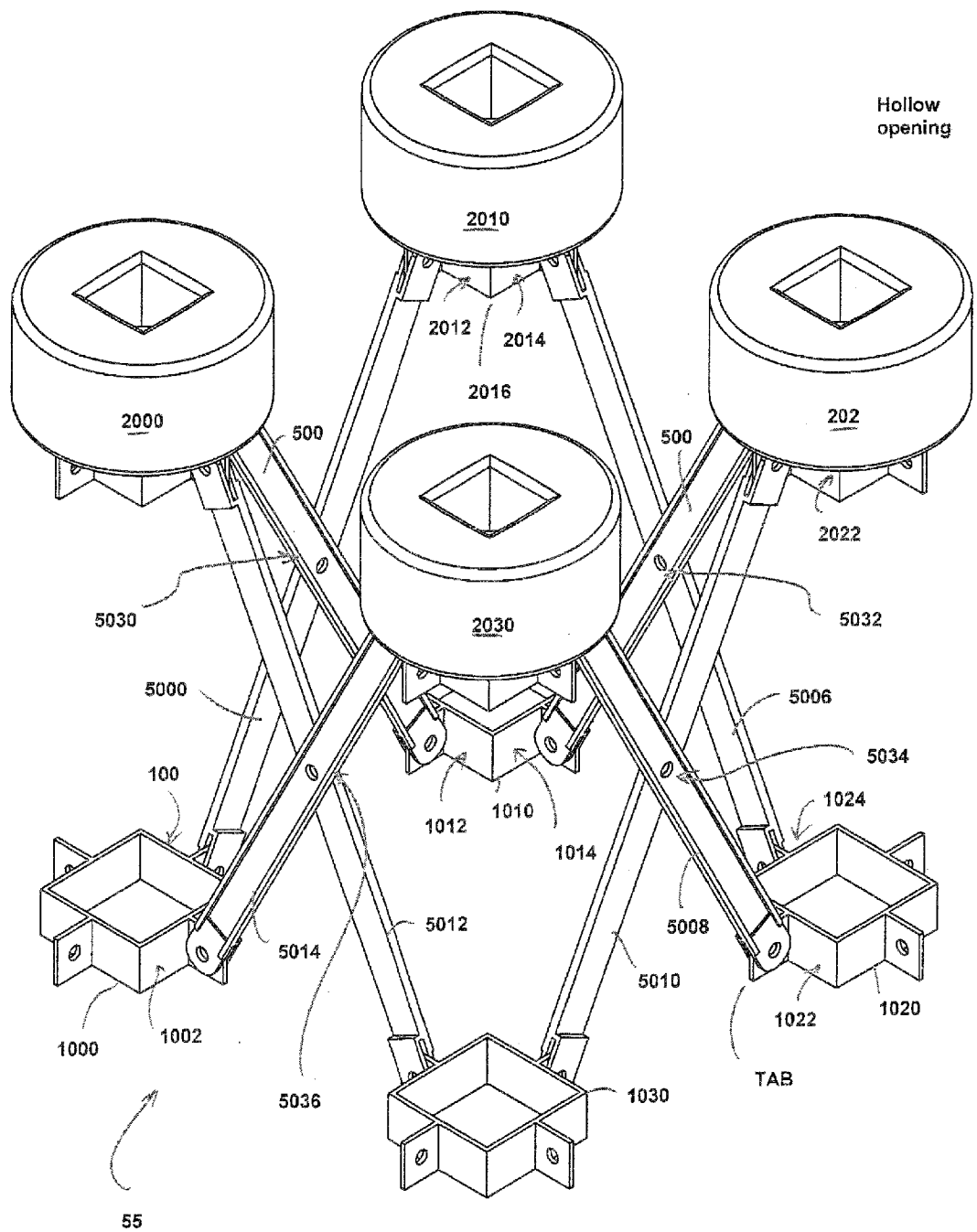
FIG. 5 shows a perspective view of an alternative expandable hydroponic growing system of the present invention.
Figure 6:
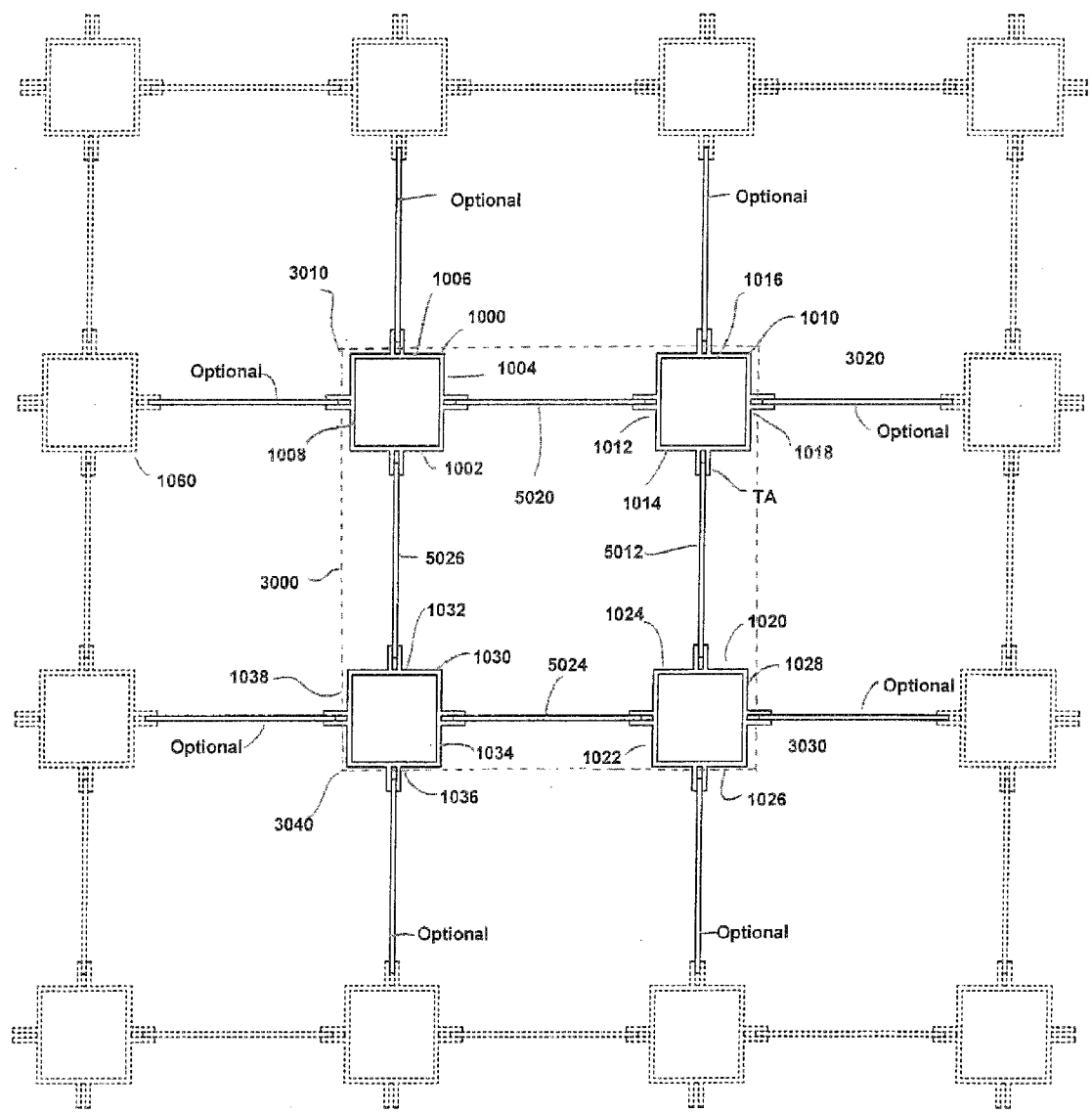
FIG. 6 shows a top view of the arrangement of the lower base components in relation to each other.
Figure 7:
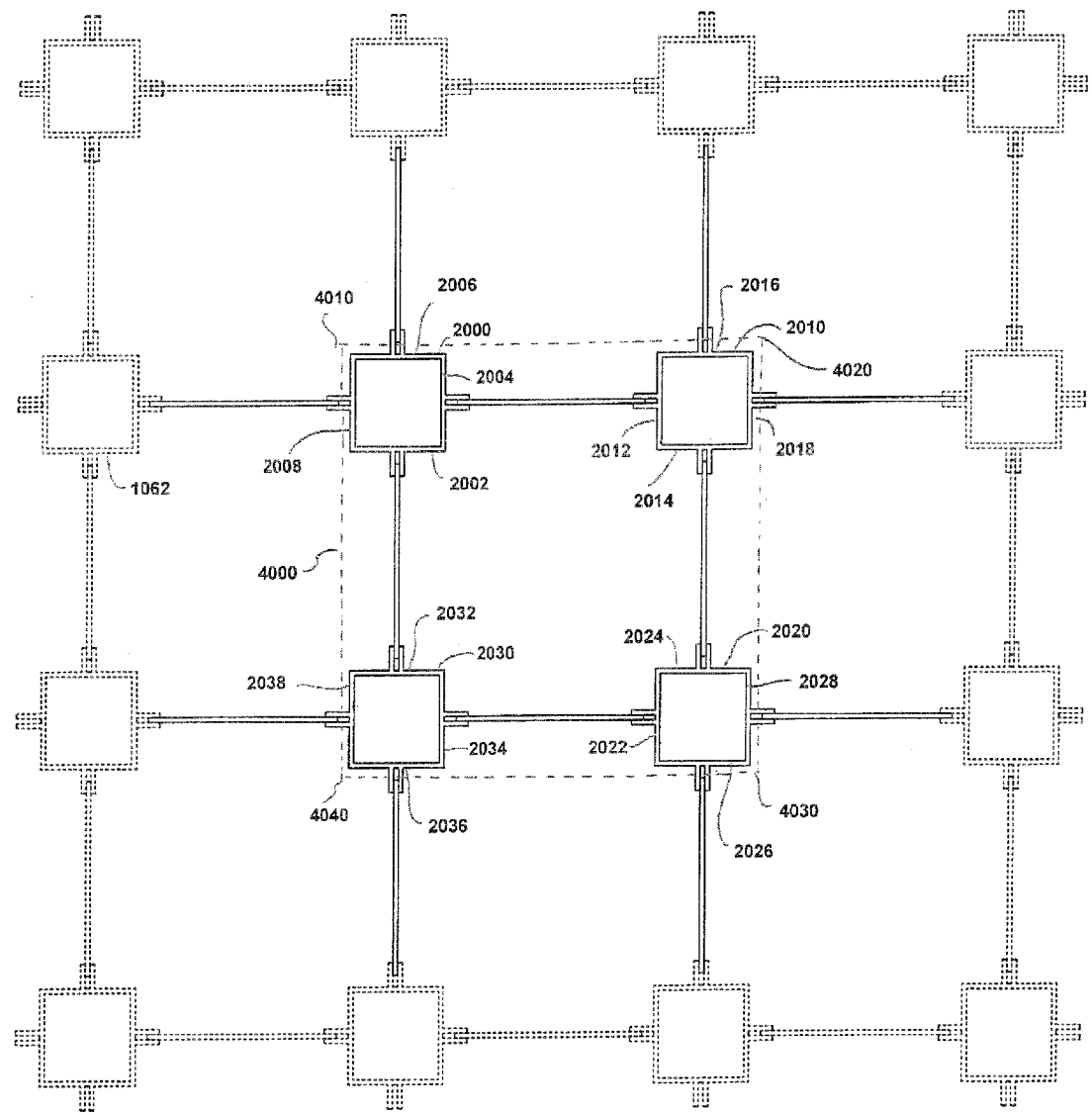
FIG. 7 shows a top view of the arrangement of the upper base components in relation to each other.
Figure 8:
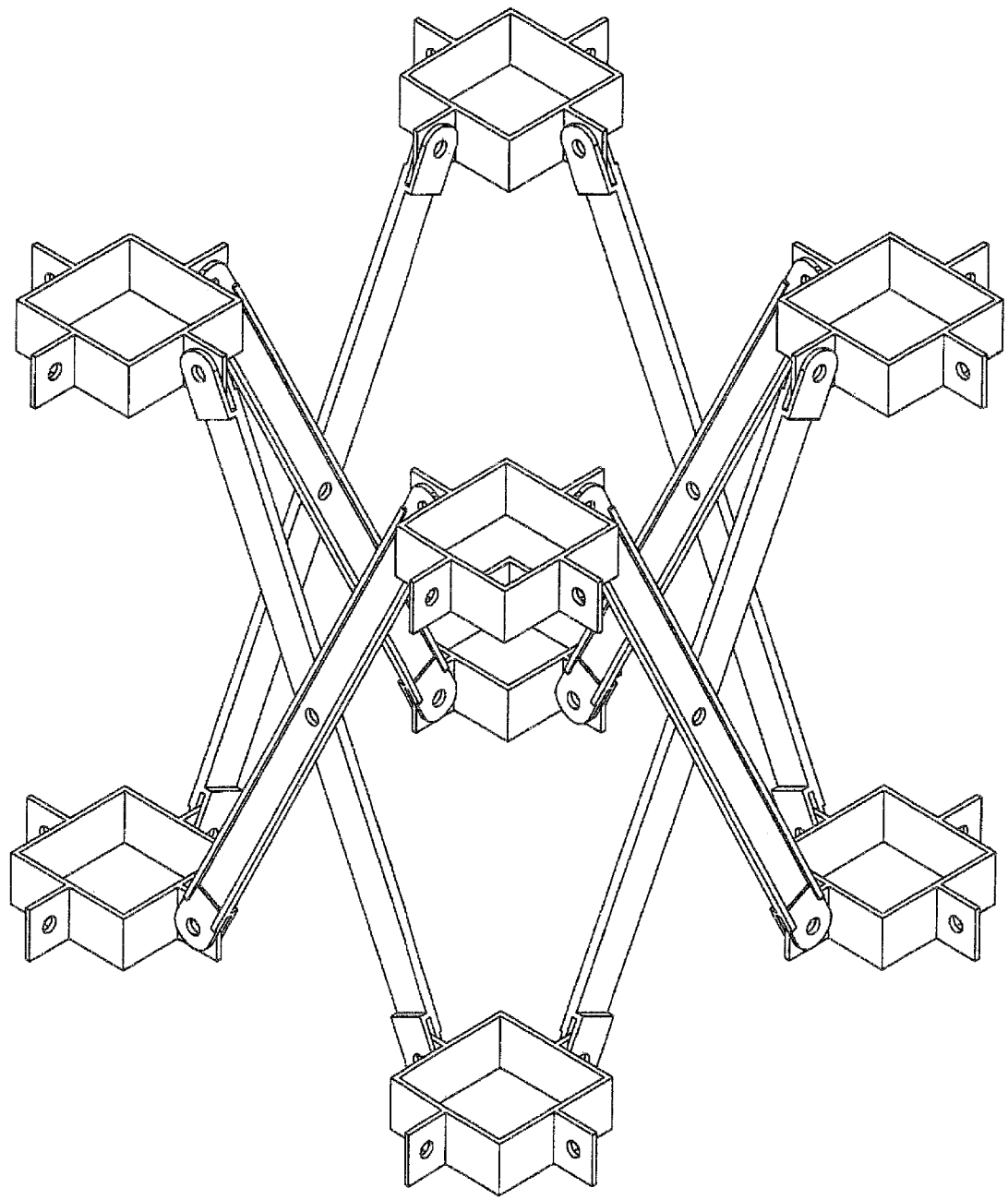
FIG. 8 shows a perspective view of the system in a semi-expanded position.

Referring now to FIG. 5, FIG. 6 and FIG. 7, the present invention also features an expandable hydroponic growing system 55. In some embodiments, the system 55 comprises a first lower base component 1000, a second lower base component 1010, a third lower base component 1020 and a fourth lower base component 1030. Each of the lower base components has a first interior side (e.g., 1002, 1012, 1022, 1032), a second interior side (1004, 1014, 1024, 1034), a first exterior side (1006, 1016, 1026, 1036) and a second exterior side (1008, 1018, 1028, 1038). In some embodiments, the lower base components are arranged in a rectangle configuration 3000 with respect to each other. For example, the first lower base component 1000 is at a first corner 3010 of the rectangle, a second lower base component 1010 is at a second corner 3020 of the rectangle, a third lower base component 1020 is a third corner 3030 of the rectangle and a fourth lower base component 1030 is at a fourth corner 3040 of the rectangle configuration.

In some embodiments, the interior side of a base (or a base component) is the side of the base that faces another base (or base component) within the imaginary rectangle, e.g., 300 or 3000, or 400 or 4000. For example, the first interior side 102 of first base 100 faces first interior side 132 of fourth base 130, etc.

In some embodiments, the system 55 further comprises a first upper base component 2000, a second upper base component 2010, a third upper base component 2020 and a fourth upper base component 2030. In some embodiments, each upper base components has a first interior side (e.g., 2002, 2012, 2022, 2032), a second interior side (e.g., 2004, 2014, 2024, 2034), a first exterior side (2006, 2016, 2026, 2036) and a second exterior side (2008, 2018, 2028, 2038). In some embodiments, the upper base components are arranged in a rectangle configuration 4000 with respect to each other. For example, the first upper base component 2000 is at a first corner 4010 of the rectangle, a second upper base component 2010 is at a second corner 4020 of the rectangle, a third upper base component 2020 is a third corner 4030 of the rectangle and a fourth upper base component 230 is at a fourth corner 4040 of the rectangle configuration.

In some embodiments, the system 55 comprises a first connector pair 5020, which comprises a first connector 5000 and a second connector 5002. In some embodiments, the first connector 5000 has a first end and a second end. The first end pivotably connects to the second interior side 1004 of the first lower base component The second end of the first connector pivotably connects the first interior side 2012 of the second upper base component. The second connector 5002 has a first end and a second end, wherein the first end of the second connector pivotably connects to the first interior side 1012 of the second lower base component, and the second end pivotably connects to the second interior side 2004 of the first upper base component;

In some embodiments, the system 55 comprises a second connector pair 5022, which comprises a third connector 5004 and a fourth connector 5006. The third connector 5004 has a first end and a second end. The first end pivotably connects to the second interior side 1014 of the second lower base component. The second end of the third connector pivotably connects the second interior side 2024 of the third upper base component. The fourth connector 5006 has a first end and a second end. The first end pivotably connects to the second interior side 1024 of the third lower base component. The second end pivotably connects to the second interior side 2014 of the second upper base component;

In some embodiments, the system 55 comprises a third connector pair 5024, which comprises a fifth connector 5008 and a sixth connector 5010. For example, the fifth connector 5008 having a first end and a second end. The first end pivotably connects to the first interior side 1022 of the third lower base component. The second end of the fifth connector pivotably connects the second interior side 2034 of the fourth upper base component. The sixth connector 5010 has a first end and a second end. The first end of the sixth connector pivotably connects to the second interior side 1034 of the fourth lower base component. The second end pivotably connects to the first interior side 2022 of the third upper base component.

In some embodiments, the system 55 comprises a fourth connector pair 5026, which comprises a seventh connector 5012 and an eighth connector 5014. For example, the seventh connector 5012 has a first end and a second end. The first end pivotably connects to the first interior side 1032 of the fourth lower base component. The second end of the seventh connector pivotably connects the first interior side 2002 of the first upper base component. The eighth connector 5014 has a first end and a second end. The first end pivotably connects to the first interior side 1002 of the first lower base component. The second end pivotably connects to the first interior side 2032 of the fourth upper base component In some embodiments, the rectangle configuration 3000/4000 is a square configuration. In some embodiments, when the rectangle configuration is a square configuration, the bar pairs are of the same length.

In some embodiments, the first lower base component 1000 is disposed directly below the first upper base component 2000, the second lower base component 1010 is disposed directly below the second upper base component 2010, the third lower base component 1020 is disposed directly below the third upper base component 2020, and the fourth lower base component 1030 is disposed directly below the fourth upper base component 2030.

In some embodiments, in a folded position, the first ends of the bars are pushed closer together, and in an expanded position, the first ends of the bars are pushed farther apart. In some embodiments, the respective two bars of each bar pair slide pass each other on a same plane. In some embodiments, optionally, the respective two bars of each bar pair are pivotably hinged at their respective mid regions (e.g., 5030, 5032, 5034, 5036).

In some embodiments, the system 55 may be extended beyond four base components with additional base components. For example, the first interior side 1002 of the first base component 1000 may be linked to an additional upper base component 1062 and the first interior side 2002 of the upper base component 2000 may be linked to an additional lower base component 1060 via a pair of connectors in a similar fashion to the first, second, third and fourth pair of connectors of the system.

In some embodiments, one or more of the base components comprise an outwardly extending tab (see FIG. 5). In some embodiments, the tab is perpendicular to the surface that it attaches to or perpendicular to a tangent line at the point where it attaches to the base. The tab may be a location connectors pivotably attach to the base components.

Figure 10:
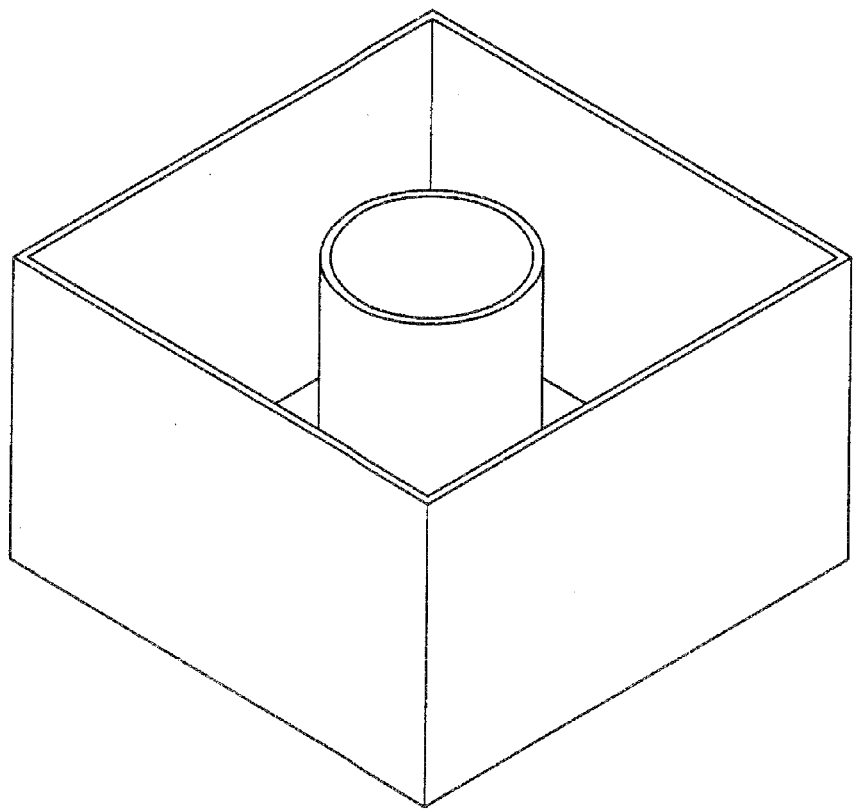
FIG. 10 shows a buoyancy structure with deep walls and a cavity. This buoyancy structure may be a base/component itself or be attached to a base/base component.
Figure 11:
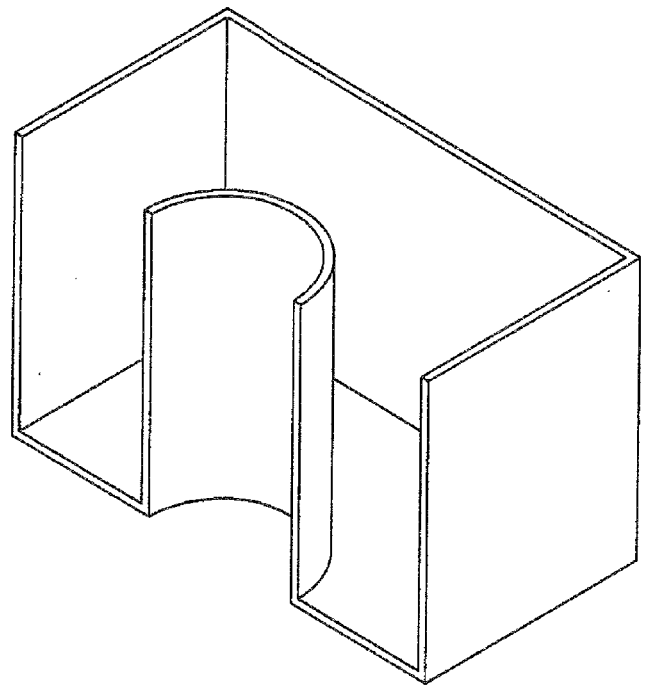
FIG. 11 shows a cross section of the buoyancy structure shown in FIG. 10.

In some embodiments, one or more of the upper bases (or base components) comprises a hollow opening. For example, a plant may be secured in the hollow opening, wherein leaves of the plant exit the upper portion of the hollow opening and root of the plant exits the lower portion of the opening, see for example FIG. 4, FIG. 10 and FIG. 11.

In some embodiments, the upper bases (or base components) comprise a buoyancy component to allow the upper bases to float in a liquid, for example water. The buoyancy component may have its buoyancy from the shape of the component. For example, the shape may be like that of a boat, where there is a deep wall that keeps water out and allows the buoyancy component to float like a boat, see for example FIG. 10 and FIG. 11.

In some embodiments, the upper bases (or base components) are secured to a buoyancy component to allow the upper bases to float in a liquid, for example water. In some embodiments, the buoyancy component derives its floating characteristics from the material that it is constructed from. Materials which float in a liquid, e.g., water, that can be used to form a buoyancy component are well known in the art.

In some embodiments, the lower bases (or base components) comprise a buoyancy component or is secured to a buoyancy component to allow the lower bases to float in a liquid, for example water. In some embodiments, the buoyancy of the lower bases (or base components) is less than that of the buoyancy of the upper bases (or base components) so that the expandable hydroponic growing system can float in a liquid (e.g., water) with the upper bases (or base components) being closer to the liquid (e.g., water) surface, and the lower bases (or lower base components) floating below the upper bases (or base components). In some embodiments, the buoyancy from the lower bases (or base components) pushes the lower bases (or base components) upwards, which causes the present hydroponic system to be biased in an expanded position. In practice, the extent of which the present hydroponic system is expanded may be controlled by a restriction component, such as the size of the pond that the hydroponic system is disposed in or a rope that is tied around the bases (base components) of the system.

The upper and lower bases or base components of the present system are not limited to any geometrical configurations. In some embodiments, one or more of the upper bases (or base components) has a cubical shape, see for example FIG. 1.

In some embodiments, one or more of the lower bases (or base components) has a cubical shape see for example FIG. 1.

Figure 4:
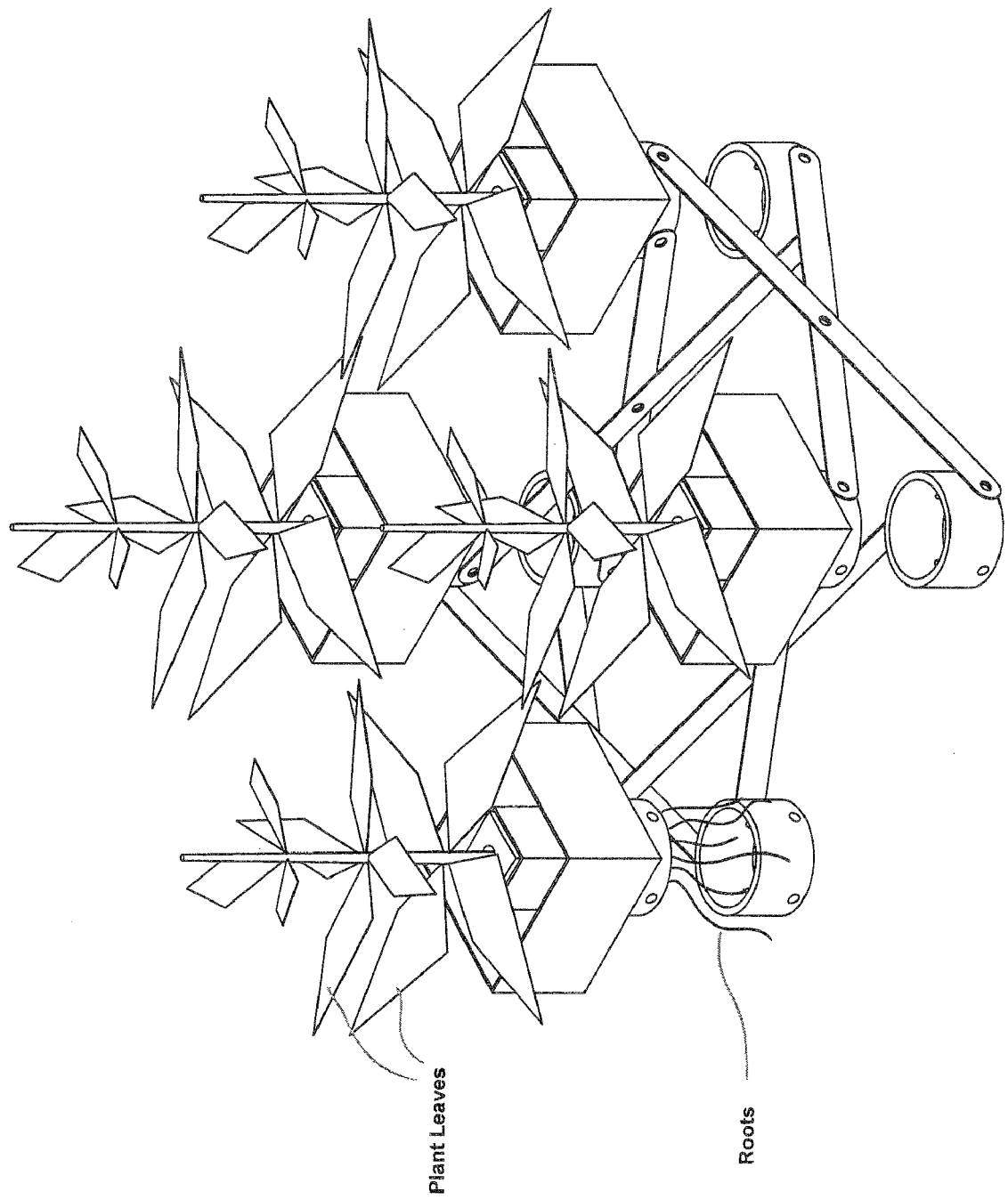
FIG. 4 shows a perspective view of the system with plants disposed within the upper bases.

In some embodiments, one or more of the upper bases (or base components) has a cylindrical shape, see for example FIG. 4 and FIG. 5.

Figure 9:
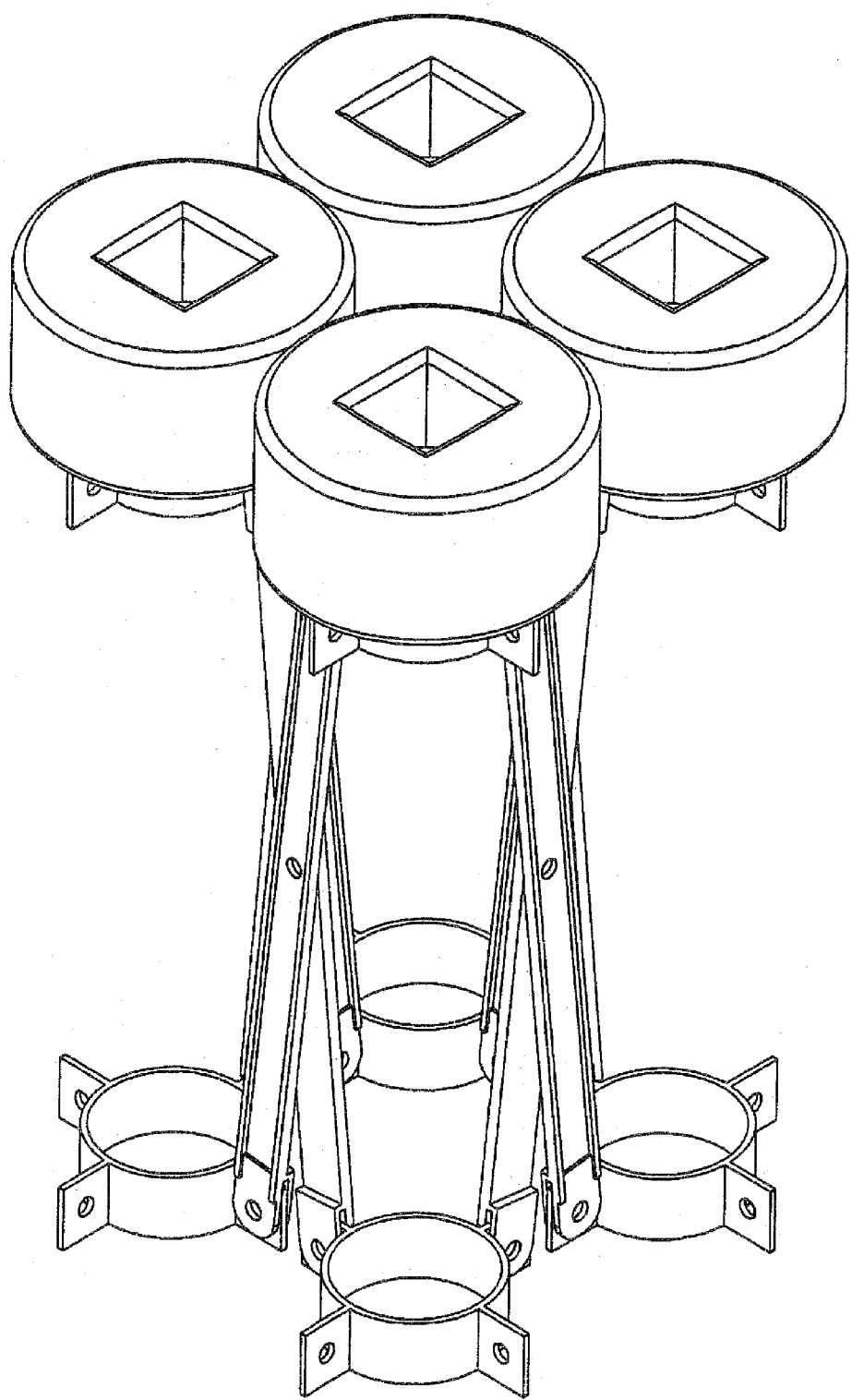
FIG. 9 shows a perspective view of the system in a folded position.

In some embodiments, one or more of the lower bases (or base components) has a cylindrical shape, see for example FIG. 9.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. An expandable hydroponic growing system comprising:
a first lower base, a second lower base, a third lower base and a fourth lower base, wherein each lower base has a first interior side, a second interior side, a first exterior side and a second exterior side; the lower bases are arranged in a rectangle configuration with respect to each other, wherein the first lower base is at a first corner of the rectangle, a second lower base is at a second corner of the rectangle, a third lower base is a third corner of the rectangle and a fourth lower base is at a fourth corner of the rectangle configuration;
a first upper base, a second upper base, a third upper base and a fourth upper base, wherein each upper base has a first interior side, a second interior side, a first exterior side and a second exterior side; the upper bases are arranged in a rectangle configuration with respect to each other, wherein the first upper base is at a first corner of the rectangle, a second upper base is at a second corner of the rectangle, a third upper base is a third corner of the rectangle and a fourth upper base is at a fourth corner of the rectangle configuration;
a first bar pair comprising a first bar and a second bar, the first bar having a first end and a second end, the first end pivotably connects to the first exterior side of the first bottom base and the second end pivotably connects to the first exterior side of the second upper base; the second bar having a first end and a second end, the first end pivotably connects to the first exterior side of the lower second base and the second end pivotably connects to the first exterior side of the first upper base;
a second bar pair comprising a third bar and a fourth bar, the third bar having a first end and a second end, the first end pivotably connects to the first interior side of the second bottom base and the second end pivotably connects to the first interior side of the third upper base; the fourth bar having a first end and a second end, the first end pivotably connects to the first interior side of the lower third base and the second end pivotably connects to the first interior side of the second upper base;
a third bar pair comprising a fifth bar and a sixth bar, the fifth bar having a first end and a second end, the first end pivotably connects to the first exterior side of the third bottom base and the second end pivotably connects to the first exterior side of the fourth upper base; the sixth bar having a first end and a second end, the first end pivotably connects to the first exterior side of the lower fourth base and the second end pivotably connects to the first exterior side of the third upper base;
a fourth bar pair comprising a seventh bar and a eighth bar, the seventh bar having a first end and a second end, the first end pivotably connects to the second interior side of the fourth bottom base and the second end pivotably connects to the second interior side of the first upper base; the eighth bar having a first end and a second end, the first end pivotably connects to the second interior side of the lower first base and the second end pivotably connects to the second interior side of the fourth upper base;
the first lower base is disposed directly below the first upper base, the second lower base is disposed directly below the second upper base, the third lower base is disposed directly below the third upper base, and the fourth lower base is disposed directly below the fourth upper base,
in a folded position, the first ends of the bars are pushed closer together, in an expanded position, the first ends of the bars are pushed farther apart; wherein the respective two bars of each bar pair slide pass each other on a same plane; and optionally, the respective two bars of each bar pair are pivotably hinged at their respective mid-regions.

2. The expandable hydroponic growing system of claim 1 wherein one or more of the upper bases comprises a hollow opening, a plant is secured in the hollow opening, leaves of the plant exit the upper portion of the hollow opening and root of the plant exits the lower portion of the opening.

3. The expandable hydroponic growing system of claim 1 wherein the upper bases comprises a buoyancy component to allow the upper bases to float in a liquid.

4. The expandable hydroponic growing system of claim 1 wherein the upper bases are secured to a buoyancy component to allow the upper bases to float in a liquid.

5. The expandable hydroponic growing system of claim 1 wherein one or more of the upper bases has a cubical shape.

6. The expandable hydroponic growing system of claim 1 wherein one or more of the lower bases has a cubical shape.

7. The expandable hydroponic growing system of claim 1 wherein one or more of the upper bases has a cylindrical shape.

8. The expandable hydroponic growing system of claim 1 wherein one or more of the lower bases has a cylindrical shape.

9. An expandable hydroponic growing system comprising:
a first lower base component, a second lower base component, a third lower base component and a fourth lower base component, wherein each lower base component has a first interior side, a second interior side, a first exterior side and a second exterior side; the lower base components are arranged in a rectangle configuration with respect to each other, wherein the first lower base component is at a first corner of the rectangle, a second lower base component is at a second corner of the rectangle, a third lower base component is a third corner of the rectangle and a fourth lower base component is at a fourth corner of the rectangle configuration;
a first upper base component, a second upper base component, a third upper base component and a fourth upper base component, wherein each upper base component has a first interior side, a second interior side, a first exterior side and a second exterior side; the upper base components are arranged in a rectangle configuration with respect to each other, wherein the first upper base component is at a first corner of the rectangle, a second upper base component is at a second corner of the rectangle, a third upper base component is a third corner of the rectangle and a fourth upper base component is at a fourth corner of the rectangle configuration;
a first connector pair comprising a first connector and a second connector, the first connector having a first end and a second end, the first end pivotably connects to the second interior side of the first lower base component, the second end of the first connector pivotably connects the first interior side of the second upper base component; the second connector having a first end and a second end, the first end pivotably connects to the first interior side of the second lower base component, the second end pivotably connects to the second interior side of the first upper base component;
a second connector pair comprising a third connector and a fourth connector, the third connector having a first end and a second end, the first end pivotably connects to the second interior side of the second lower base component, the second end of the third connector pivotably connects the second interior side of the third upper base component; the fourth connector having a first end and a second end, the first end pivotably connects to the second interior side of the third lower base component, the second end pivotably connects to the second interior side of the second upper base component;
a third connector pair comprising a fifth connector and a sixth connector, the fifth connector having a first end and a second end, the first end pivotably connects to the first interior side of the third lower base component, the second end of the fifth connector pivotably connects the second interior side of the fourth upper base component; the sixth connector having a first end and a second end, the first end pivotably connects to the second interior side of the fourth lower base component, the second end pivotably connects to the first interior side of the third upper base component;
a fourth connector pair comprising a seventh connector and a eighth connector, the seventh connector having a first end and a second end, the first end pivotably connects to the first interior side of the fourth lower base component, the second end of the seventh connector pivotably connects the first interior side of the first upper base component; the eighth connector having a first end and a second end, the first end pivotably connects to the first interior side of the first lower base component, the second end pivotably connects to the first interior side of the fourth upper base component;
the first lower base component is disposed directly below the first upper base component, the second lower base component is disposed directly below the second upper base component, the third lower base component is disposed directly below the third upper base component, and the fourth lower base component is disposed directly below the fourth upper base component,
in a folded position, the first ends of the bars are pushed closer together, in an expanded position, the first ends of the bars are pushed farther apart; wherein the respective two bars of each bar pair slide pass each other on a same plane; and optionally, the respective two bars of each bar pair are pivotably hinged at their respective mid-regions.

10. The expandable hydroponic growing system of claim 9 wherein one or more of the upper base components comprises a hollow opening, a plant is secured in the hollow opening, leaves of the plant exit the upper portion of the hollow opening and root of the plant exits the lower portion of the opening.

11. The expandable hydroponic growing system of claim 9 wherein the upper base components comprises a buoyancy component to allow the upper base components to float in a liquid.

12. The expandable hydroponic growing system of claim 9 wherein the upper base components are secured to a buoyancy component to allow the upper base components to float in a liquid.

13. The expandable hydroponic growing system of claim 9 wherein one or more of the upper base components has a cubical shape.

14. The expandable hydroponic growing system of claim 9 wherein one or more of the lower base components has a cubical shape.

15. The expandable hydroponic growing system of claim 9 wherein one or more of the upper base components has a cylindrical shape.

16. The expandable hydroponic growing system of claim 9 wherein one or more of the lower base components has a cylindrical shape.

17. An expandable hydroponic growing system comprising:
a first lower base, a second lower base, a third lower base and a fourth lower base; the lower bases are arranged in a rectangle configuration with respect to each other, wherein the first lower base is at a first corner of the rectangle, a second lower base is at a second corner of the rectangle, a third lower base is a third corner of the rectangle and a fourth lower base is at a fourth corner of the rectangle configuration;
a first upper base, a second upper base, a third upper base and a fourth upper base; the upper bases are arranged in a rectangle configuration with respect to each other, wherein the first upper base is at a first corner of the rectangle, a second upper base is at a second corner of the rectangle, a third upper base is a third corner of the rectangle and a fourth upper base is at a fourth corner of the rectangle configuration;

a first bar pair comprising a first bar and a second bar, the first bar having a first end and a second end, the first end pivotably connects to the first exterior side of the first bottom base and the second end pivotably connects to the second upper base; the second bar having a first end and a second end, the first end pivotably connects to the lower second base and the second end pivotably connects to the first upper base;

a second bar pair comprising a third bar and a fourth bar, the third bar having a first end and a second end, the first end pivotably connects to the second bottom base and the second end pivotably connects to the third upper base; the fourth bar having a first end and a second end, the first end pivotably connects to the lower third base and the second end pivotably connects to the second upper base;

a third bar pair comprising a fifth bar and a sixth bar, the fifth bar having a first end and a second end, the first end pivotably connects to the third bottom base and the second end pivotably connects to the first exterior side of the fourth upper base; the sixth bar having a first end and a second end, the first end pivotably connects to the lower fourth base and the second end pivotably connects to the third upper base;

a fourth bar pair comprising a seventh bar and a eighth bar, the seventh bar having a first end and a second end, the first end pivotably connects to the fourth bottom base and the second end pivotably connects to the first upper base; the eighth bar having a first end and a second end, the first end pivotably connects to the lower first base and the second end pivotably connects to the fourth upper base;

the first lower base is disposed directly below the first upper base, the second lower base is disposed directly below the second upper base, the third lower base is disposed directly below the third upper base, and the fourth lower base is disposed directly below the fourth upper base, in a folded position, the first ends of the bars are pushed closer together, in an expanded position, the first ends of the bars are pushed farther apart; wherein the respective two bars of each bar pair slide pass each other on a same plane; and optionally, the respective two bars of each bar pair are pivotably hinged at their respective mid-regions.

* * * * *